(12) United States Patent
Birau et al.

(10) Patent No.: US 8,808,437 B2
(45) Date of Patent: Aug. 19, 2014

(54) PHASE CHANGE INKS CONTAINING QUINACRIDONE PIGMENTS AND SYNERGISTS

(71) Applicant: Xerox Corporation, Norwalk, CT (US)

(72) Inventors: Maria M. Birau, Mississauga (CA); C. Geoffrey Allen, Waterdown (CA); Biby E. Abraham, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/685,516

(22) Filed: Nov. 26, 2012

(65) Prior Publication Data

US 2014/0144348 A1  May 29, 2014

(51) Int. Cl.
*C09D 11/02*  (2014.01)
*C09D 7/00*   (2006.01)
*C09D 11/00*  (2014.01)

(52) U.S. Cl.
CPC ............... *C09D 7/007* (2013.01); *C09D 11/34* (2013.01)
USPC .................................... 106/31.29; 106/31.61

(58) Field of Classification Search
USPC ........................................ 106/31.29, 31.61
See application file for complete search history.

(56) References Cited

U.S. PATENT DOCUMENTS 6,224,661 B1 *  5/2001  Tregub et al. ............... 106/31.61
2003/0127021 A1 *  7/2003  Brown ........................ 106/31.61

(Continued)

FOREIGN PATENT DOCUMENTS

WO   2002064680 A1   8/2002
WO   2007060258 A2   5/2007

(Continued)

*Primary Examiner* — Veronica F Faison
(74) *Attorney, Agent, or Firm* — MDIP LLC

(57) ABSTRACT

Disclosed is a phase change ink comprising (i) an ink carrier; (ii) a quinacridone pigment; (iii) a synergist of the formula

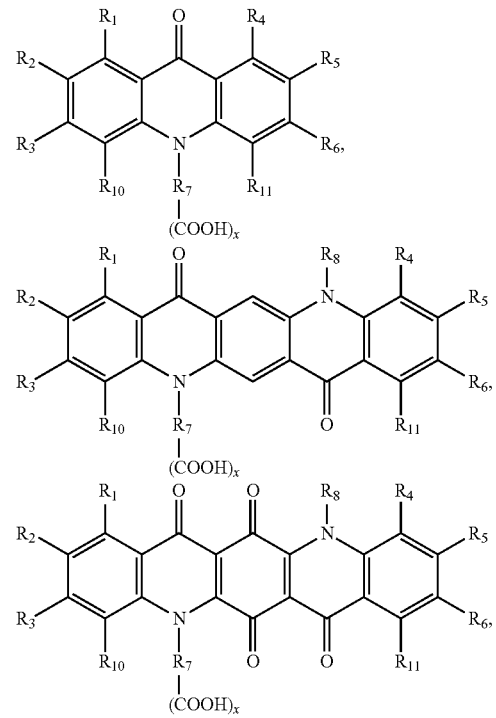

or mixtures thereof, wherein $R_1$, $R_2$, $R_3$, $R_4$, $R_5$, $R_6$, $R_7$, $R_8$, $R_{10}$, $R_{11}$, and x are as defined herein; and (iv) a pigment dispersant; said phase change ink being a solid at about 25° C.

19 Claims, 3 Drawing Sheets

(56) References Cited

U.S. PATENT DOCUMENTS

| | | |
|---|---|---|
| 2004/0060478 A1 | 4/2004 | Weber et al. |
| 2007/0125260 A1* | 6/2007 | Grimm et al. ............... 106/31.6 |
| 2008/0295734 A1* | 12/2008 | Deroover ................. 106/31.77 |
| 2008/0305261 A1* | 12/2008 | Deroover et al. ............. 427/256 |
| 2010/0050904 A1* | 3/2010 | Jesse et al. .................. 106/496 |
| 2011/0177245 A1* | 7/2011 | Dalal et al. .................... 427/256 |

FOREIGN PATENT DOCUMENTS

| | | |
|---|---|---|
| WO | 2007060259 A2 | 5/2007 |
| WO | 2007060265 A2 | 5/2007 |

* cited by examiner

PHASE CHANGE INKS CONTAINING QUINACRIDONE PIGMENTS AND SYNERGISTS

BACKGROUND

Disclosed herein are phase change ink compositions containing quinacridone pigments. More specifically, disclosed herein are phase change inks containing quinacridone pigments along with pigment dispersants and specific synergists.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, or the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, or the like), the droplets solidify immediately upon contact with the substrate, so that migration of ink along the printing medium is prevented and dot quality is improved.

Organic pigments disperse with difficulty in non-polar media such as phase change ink carriers. One approach for dispersing pigments is to modify the surface of the pigment by addition of compounds known as synergists. A pigment stabilizer or synergist works by enhancing the attachment of a dispersant onto the pigment particle.

Quinacridone pigments in particular are very difficult to disperse and stabilize in low polarity waxes and resins such as those often used in phase change inks. The use of synergists is almost always needed in conjunction with a pigment dispersant to stabilize pigments of this class in a phase change ink having low polarity waxes and resins as the carrier.

SUMMARY

Disclosed herein is a phase change ink comprising: (i) an ink carrier; (ii) a quinacridone pigment; (iii) a synergist: (a) of the formula:

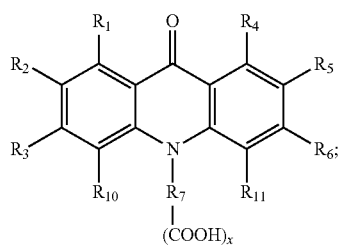

(b) of the formula

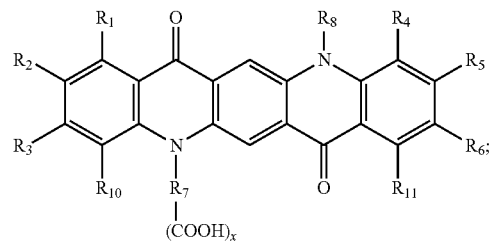

(c) of the formula

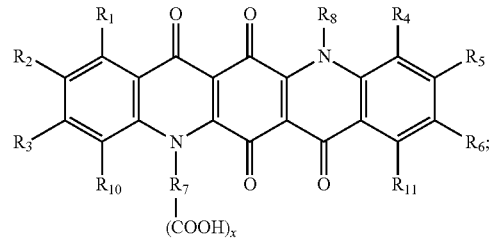

or (d) comprising a mixture thereof; wherein: (1) $R_1$, $R_2$, $R_3$, $R_4$, $R_5$, $R_6$, $R_{10}$, and $R_{11}$ each, independently of the others, is: (A) hydrogen; (B) halogen; (C) alkyl; or (D) alkoxy; (2) $R_7$ is: (A) alkylene; (B) arylene; (C) arylalkylene; or (D) alkylarylene; (3) x is an integer of at least 1; (4) $R_8$ is: (A) hydrogen; or (B) —$R_9$—$(COOH)_y$, wherein $R_9$ has the same definition as $R_7$ and can be either the same as or different from $R_7$, and wherein y has the same definition as x, and can be either the same as or different from x; and (iv) a pigment dispersant; said phase change ink being a solid at about 25° C.

DETAILED DESCRIPTION

Figure 1:
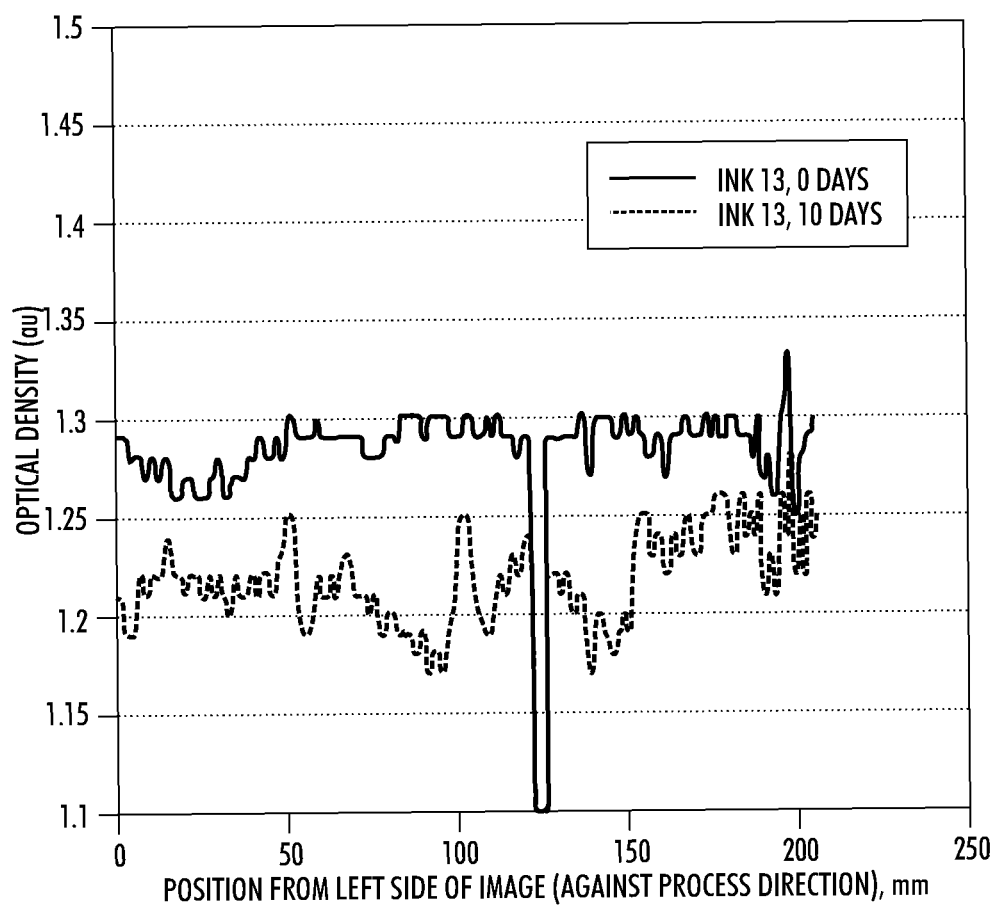
FIGS. 1, 2, and 3 are graphs representing optical density of an ink containing a synergist as disclosed herein compared to an ink containing no synergist and compared to an ink containing a dye-based colorant, freshly prepared and after 10 days of aging in a printer at 128° C.
Figure 2:
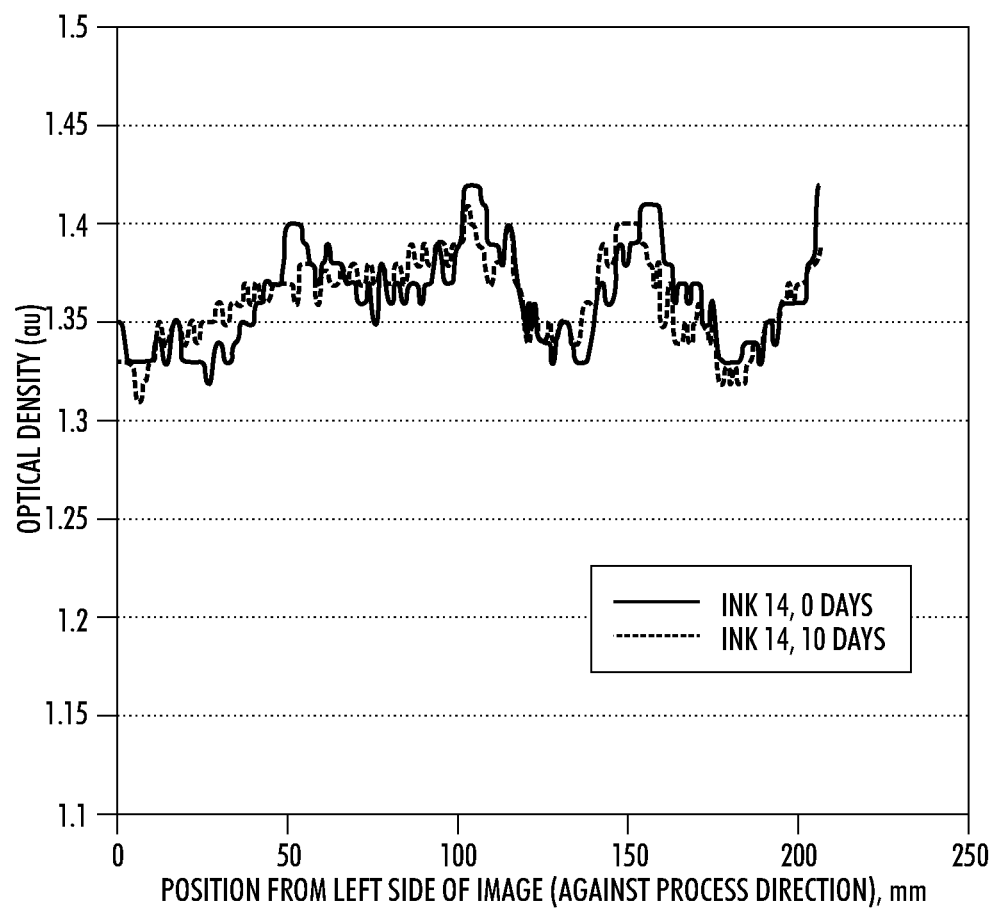

The inks disclosed herein contain a synergist. The synergist in one embodiment is of the general formula

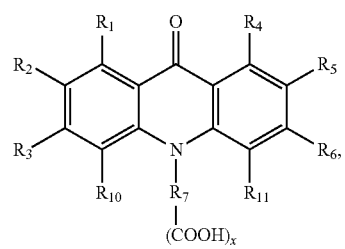

-continued

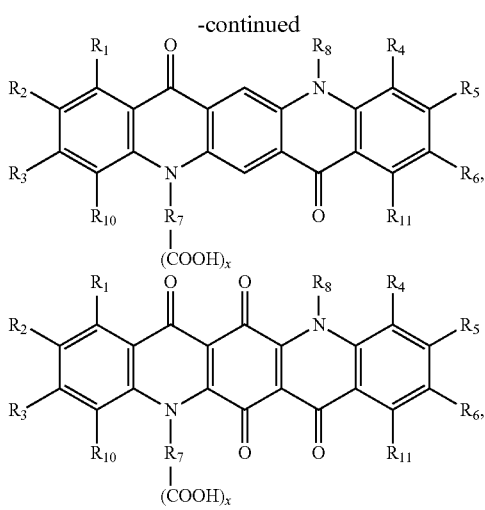

wherein:

(i) $R_1$, $R_2$, $R_3$, $R_4$, $R_5$, $R_6$, $R_{10}$, and $R_{11}$ each, independently of the others, is:

(a) hydrogen;
(b) halogen, such as fluorine, chlorine, bromine, iodine, or the like;
(c) alkyl, including linear, branched, saturated, unsaturated, cyclic, substituted, and unsubstituted alkyl, wherein hetero atoms, such as oxygen, nitrogen, sulfur, silicon, phosphorus, boron, or the like either may or may not be present in alkyl, in one embodiment with at least 1 carbon, and in one embodiment with no more than about 4 carbons, in another embodiment with no more than about 2 carbons, and in yet another embodiment with no more than about 1 carbon; or
(d) alkoxy, including linear, branched, saturated, unsaturated, cyclic, substituted, and unsubstituted alkoxy, wherein hetero atoms, such as oxygen, nitrogen, sulfur, silicon, phosphorus, boron, or the like either may or may not be present in alkoxy, in one embodiment with at least one carbon, and in one embodiment with no more than about 4 carbons, in another embodiment with no more than about 2 carbons, and in yet another embodiment with no more than about 1 carbon;

(ii) $R_7$ is:

(a) alkylene, including linear, branched, saturated, unsaturated, cyclic, substituted, and unsubstituted alkylene, and wherein hetero atoms, such as oxygen, nitrogen, sulfur, silicon, phosphorus, boron, or the like either may or may not be present in alkylene, in one embodiment with at least about 1 carbon, in another embodiment with at least about 2 carbons, and in yet another embodiment with at least about 3 carbons, and in one embodiment with no more than about 12 carbons, in another embodiment with no more than about 8 carbons, in yet another embodiment with no more than about 6 carbons, and in still another embodiment with no more than about 3 carbons, such as methylene or the like;
(b) arylene, including substituted and unsubstituted arylene, wherein hetero atoms, such as oxygen, nitrogen, sulfur, silicon, phosphorus, boron, or the like either may or may not be present in arylene, in one embodiment with at least about 6 carbons, in another embodiment with at least about 8 carbons, and in yet another embodiment with at least about 9 carbons, and in one embodiment with no more than about 14 carbons, in another embodiment with no more than about 12 carbons, and in yet another embodiment with no more than about 10 carbons, such as phenylene or the like;
(c) arylalkylene, including substituted and unsubstituted arylalkylene, wherein the alkyl portion of arylalkylene can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of arylalkylene, in one embodiment with at least about 7 carbons, in another embodiment with at least about 8 carbons, and in yet another embodiment with at least about 12 carbons, and in one embodiment with no more than about 20 carbons, in another embodiment with no more than about 17 carbons, and in yet another embodiment with no more than about 13 carbons, such as benzylene or the like; or
(d) alkylarylene, including substituted and unsubstituted alkylarylene, wherein the alkyl portion of alkylarylene can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of alkylarylene, in one embodiment with at least about 7 carbons, in another embodiment with at least about 8 carbons, and in yet another embodiment with at least about 12 carbons, and in one embodiment with no more than about 20 carbons, in another embodiment with no more than about 17 carbons, and in yet another embodiment with no more than about 13 carbons, such as tolylene or the like;

(iii) x is an integer of at least 1, and is in a specific embodiment 1 or 2; and (iv) $R_8$ is:

(a) hydrogen; or
(b) —$R_9$—$(COOH)_y$, wherein $R_9$ has the same definition as $R_7$ and can be either the same as or different from $R_7$, and wherein y has the same definition as x, and can be either the same as or different from x;

wherein the substituents on the substituted alkyls, alkylenes, aryls, arylenes, arylalkyls, arylalkylenes, alkylaryls, and alkylarylenes can be hydroxy, halogen, amine, imine, ammonium, cyano, pyridines, pyridiniums, ethers, aldehydes, ketones, esters, amides, carbonyls, thiocarbonyls, sulfates, sulfonates, sulfonic acids, sulfides, sulfoxides, phosphines, phosphoniums, phosphates, nitriles, mercaptos, nitros, nitrosos, sulfones, acyls, acid anhydrides, azides, azos, cyanatos, isocyanatos, thiocyanatos, isothiocyanatos, carboxylates, carboxylic acids, urethanes, ureas, silyls, siloxyls, silanes, mixtures thereof, or the like, wherein two or more substituents can be joined together to form a ring.

When $R_8$ is —$R_9$—$(COOH)_y$, the compound is of the formula

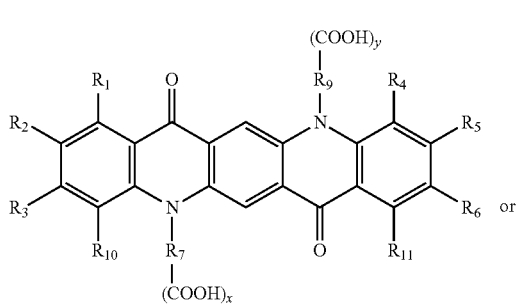

or

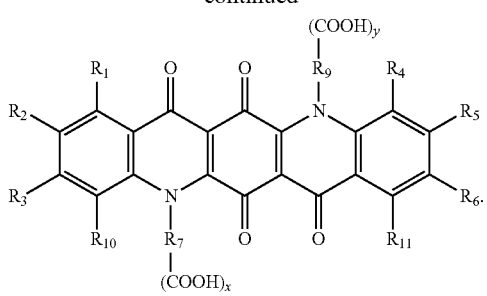

Specific examples of suitable synergists include the following:

(a) 2-(9-oxoacridin-10(9H)-yl)acetic acid:

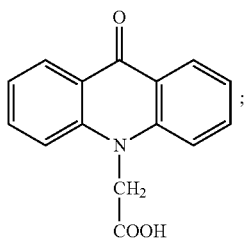 [SMILES: O=C(O)Cn1c2ccccc2c(=O)c2ccccc21]

(b) 2-(7,14-dioxoquinolino[2,3-b]acridin-5(7H,12H,14H)-yl)acetic acid:

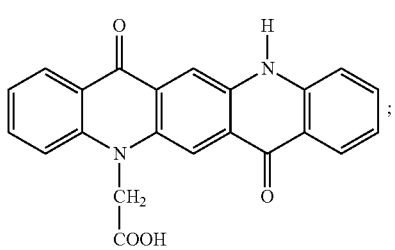 [SMILES: O=C(O)Cn1c2ccccc2c(=O)c2cc3[nH]c4ccccc4c(=O)c3cc21]

(c) 2,2'-(7,14-dioxoquinolino[2,3-b]acridine-5,12(7H,14H)-diyl)diacetic acid:

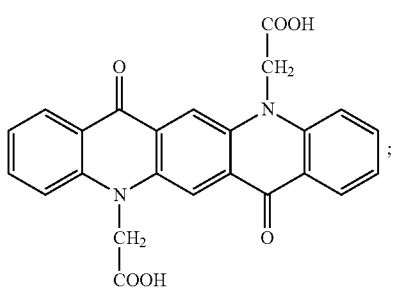 [SMILES: O=C(O)Cn1c2ccccc2c(=O)c2cc3c(cc21)c(=O)c1ccccc1n3CC(=O)O]

(d) 2-(2,9-dimethyl-7,14-dioxoquinolino[2,3-b]acridin-5(7H,12H,14H)-yl)acetic acid:

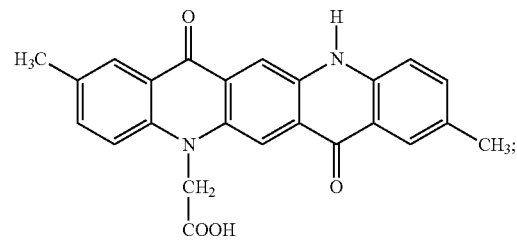 [SMILES: Cc1ccc2[nH]c3cc4c(=O)c5cc(C)ccc5n(CC(=O)O)c4cc3c(=O)c2c1]

(e) 2,2'-(2,9-dimethyl-7,14-dioxoquinolino[2,3-b]acridine-5,12(7H,14H)-diyl)diacetic acid:

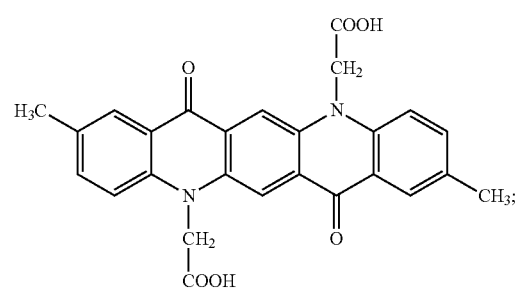 [SMILES: Cc1ccc2c(c1)c(=O)c1cc3c(cc1n2CC(=O)O)c(=O)c1cc(C)ccc1n3CC(=O)O]

(f) 2-(9-methyl-7,14-dioxoquinolino[2,3-b]acridin-5(7H,12H,14H)-yl)acetic acid:

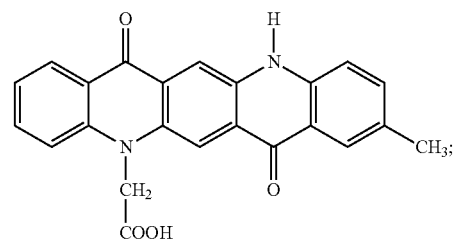 [SMILES: Cc1ccc2[nH]c3cc4c(=O)c5ccccc5n(CC(=O)O)c4cc3c(=O)c2c1]

(g) 2-(2-methyl-7,14-dioxoquinolino[2,3-b]acridin-5(7H,12H,14H)-yl)acetic acid:

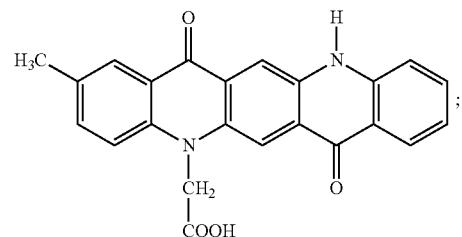 [SMILES: Cc1ccc2c(c1)c(=O)c1cc3[nH]c4ccccc4c(=O)c3cc1n2CC(=O)O]

or the like, as well as mixtures thereof.

The synergist is present in the ink in any desired or effective amount, in one embodiment at least about 0.1% by weight of the ink, in another embodiment at least about 0.2% by weight of the ink, and in yet another embodiment at least about 0.5% by weight of the ink, and in one embodiment no more than about 4% by weight of the ink, in another embodiment no more than about 3% by weight of the ink, and in yet another embodiment no more than about 2% by weight of the ink.

In another embodiment, the synergist is present in the ink in an amount of in one embodiment at least about 5% by weight of the pigment, in another embodiment at least about 10% by weight of the pigment, and in yet another embodiment at least about 20% by weight of the pigment, and in one embodiment no more than about 40% by weight of the pigment, in another embodiment no more than about 30% by weight of the pigment, and in yet another embodiment no more than about 25% by weight of the pigment.

Synergists of these formulae can be prepared by any desired or suitable method, such as the methods disclosed in, for example, WO2007/060259A2; WO2007/060258A2; WO2007/060265A2; Z. Szulk, J. Mlochowski, *Polish Journal of Chemistry*, 60, 1988, 615-619; J. X. Kelley, M. J. Smilkstein, R. A. Cooper, K. D. Lane, R. A. Johnson, A. Janowski, R. A. Dodean, D. J. Hinrichs, R. Winter, M. Riscoe, *Antimicrobial Agents and Chemotherapy*, 51(11), 2007, 4133-4140; and M-H. David-Cordonier, M-P. Hildebrand, B. Baldeyrou, A. Lansiaux, C. Keuser, K. Benzschawel, T. Lemster, U. Pindur, *European Journal of Medicinal Chemistry*, 42, 2007, 752-771; the disclosures of each of which are totally incorporated herein by reference. More specifically, the compounds can be prepared by N-alkylation of the NH group of a quinacridone or quinacridone-related compound using a halogenated ester followed by hydrolysis of the resulting N-alkylated ester compound in a strong base and precipitation with an inorganic acid.

The phase change inks disclosed herein also contain a pigment dispersant. Examples of suitable pigment dispersants include SOLSPERSE™ 13240, a nonionic dispersant which is an amide of polyhydroxystearic acid and polyethyleneimine available from Lubrizol Advanced Materials, Inc., Cleveland, Ohio; dispersants of the formulae

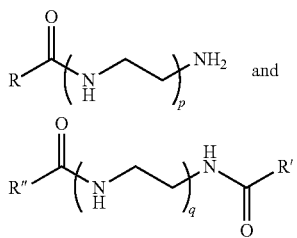

wherein R, R', and R" each, independently of the others, is:

(a) alkyl, including linear, branched, saturated, unsaturated, cyclic, acyclic, substituted, and unsubstituted alkyl, and wherein hetero atoms, such as oxygen, nitrogen, sulfur, silicon, phosphorus, boron, or the like either may or may not be present in alkyl, in one embodiment with at least about 1 carbon, in another embodiment with at least about 2 carbons, in yet another embodiment with at least about 3 carbons, in another embodiment with at least about 16 carbons, and in still another embodiment with at least about 23 carbons, and in one embodiment with no more than about 200 carbons, in another embodiment with no more than about 150 carbons, in yet another embodiment with no more than about 100 carbons, in another embodiment with no more than about 12 carbons, in yet another embodiment with no more than about 8 carbons, and in still another embodiment with no more than about 6 carbons, such as methyl or the like;

(b) arylalkyl, including substituted and unsubstituted arylalkyl, wherein the alkyl portion of arylalkyl can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of arylalkyl, in one embodiment with at least about 6 carbons, and in another embodiment with at least about 23 carbons, and in one embodiment with no more than about 200 carbons, in another embodiment with no more than about 150 carbons, yet another embodiment with no more than about 100 carbons, and in still another embodiment with no more than about 12 carbons, such as benzyl or the like; or (c) alkylaryl, including substituted and unsubstituted alkylaryl, wherein the alkyl portion of alkylaryl can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of alkylaryl, in one embodiment with at least about 6 carbons, and in another embodiment with at least about 23 carbons, and in one embodiment with no more than about 200 carbons, in another embodiment with no more than about 150 carbons, yet another embodiment with no more than about 100 carbons, and in still another embodiment with no more than about 12 carbons, such as tolyl or the like;

wherein the substituents on the substituted alkyls, alkylaryls, and arylalkyls can be as set forth hereinabove;

and wherein p and q are each integers representing the number of repeat —(CH$_2$CH$_2$NH)— groups and are in one embodiment at least about 1, and in one embodiment no more than about 30, in another embodiment no more than about 20, and in yet another embodiment no more than about 14, prepared as disclosed in U.S. Pat. No. 7,973,186, the disclosure of which is totally incorporated herein by reference, or the like, as well as mixtures thereof.

In one specific embodiment, the pigment dispersant is as prepared in Example 1 of U.S. Pat. No. 7,973,186, of the formula

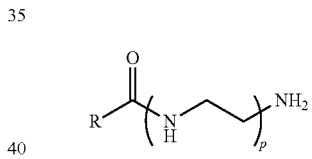

wherein R is a linear aliphatic hydrocarbon having an average of about 48 carbons and p is 4, 5, or 6, wherein the average value of p is such that

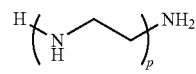

has a number average molecular weight of 250-300 (hereinafter referred to as Dispersant 1).

The pigment, when processed with the synergist, such as by milling methods, allows the synergist to associate itself with the pigment surface. The synergist, being acidic, is receptive to a basic dispersant to result in an acid-base interaction capable of improving the dispersion characteristics of the pigment.

The pigment dispersant is present in the ink in any desired or effective amount, in one embodiment at least about 0.1% by weight of the ink, in another embodiment at least about 0.5% by weight of the ink, and in yet another embodiment at least about 2% by weight of the ink, and in one embodiment no more than about 7% by weight of the ink, in another embodiment no more than about 6% by weight of the ink, and in yet another embodiment no more than about 5% by weight of the ink.

In another embodiment, the pigment dispersant is present in the ink in an amount of in one embodiment at least about 5% by weight of the pigment, in another embodiment at least about 20% by weight of the pigment, and in yet another embodiment at least about 80% by weight of the pigment, and in one embodiment no more than about 300% by weight of the pigment, in another embodiment no more than about 250% by weight of the pigment, and in yet another embodiment no more than about 200% by weight of the pigment.

The phase change inks disclosed herein further contain a quinacridone pigment colorant. Examples of suitable quinacridone colorants include those of the formulae

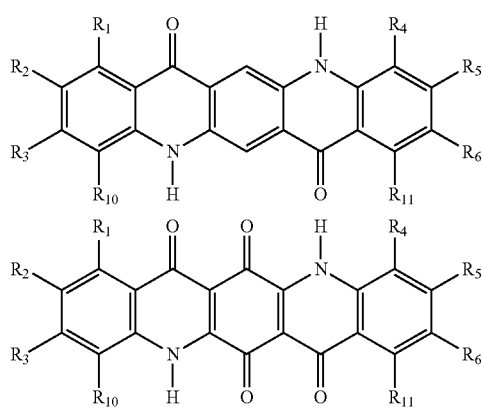

and wherein $R_1$, $R_2$, $R_3$, $R_4$, $R_5$, $R_6$, $R_{10}$, and $R_{11}$ are as defined hereinabove. Specific examples of quinacridone pigments include Pigment Violet 19, wherein $R_1$, $R_2$, $R_3$, $R_4$, $R_5$, $R_6$, $R_6$, $R_{10}$, and $R_{11}$ are all hydrogen, Pigment Red 122, a mixture of compounds of the formulae

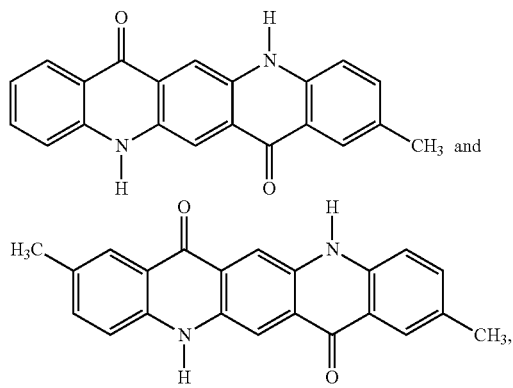

Pigment Red 202:

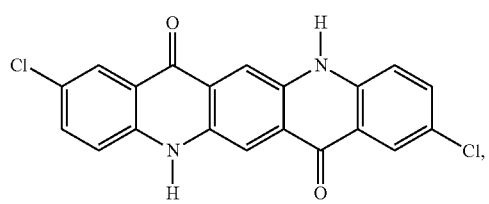 [SMILES: O=c1c2cc(Cl)ccc2[nH]c2cc3c(=O)c4cc(Cl)ccc4[nH]c3cc12]

Pigment Red 206 (C.I. 73900):

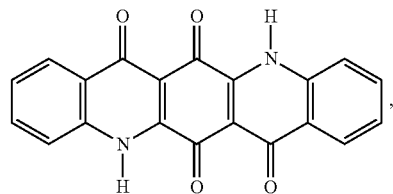 [SMILES: O=C1c2[nH]c3ccccc3c(=O)c2C(=O)c2[nH]c3ccccc3c(=O)c21]

,

C.I. 73920:

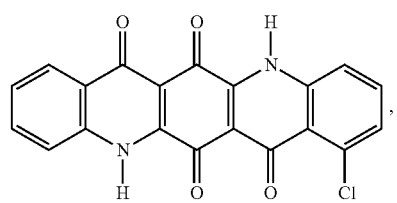 [SMILES: O=C1c2[nH]c3cccc(Cl)c3c(=O)c2C(=O)c2[nH]c3ccccc3c(=O)c21]

,

Pigment Orange 48 and Pigment Orange 49 (both of which are mixtures of unsubstituted quinacridone and quinacridone quinone), and the like, as well as mixtures thereof.

The quinacridone pigment colorant is present in the ink in any desired or effective amount to provide the desired color or hue, in one embodiment at least about 0.5% by weight of the ink, in another embodiment at least about 1% by weight of the ink, and in yet another embodiment at least about 2% by weight of the ink, and in one embodiment no more than about 10% by weight of the ink, in another embodiment no more than about 6% by weight of the ink, and in yet another embodiment no more than about 3% by weight of the ink.

In one specific embodiment, $R_1$, $R_2$, $R_3$, $R_4$, $R_5$, $R_6$, $R_{10}$, and $R_{11}$ for the synergist are the same as for the quinacridone pigment colorant. In another embodiment, the synergist has the same structure as the quinacridone pigment colorant except that one or both of the hydrogen atoms on the nitrogens in the structure are substituted with carboxyl-substituted alkylenes or arylenes.

If desired, other colorants can be present in combination with the quinacridone pigment to provide the desired color or hue. These other colorants can be dyes, pigments, and/or combinations thereof.

Phase change inks as disclosed herein contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, triamides, tetra-amides, mixtures thereof, and the like. Specific examples of suitable fatty amide ink carrier materials include stearyl stearamide and branched triamides as disclosed in U.S. Pat. No. 6,860,930, the disclosure of which is totally incorporated herein by reference. In one specific embodiment, the branched triamide is of the formula

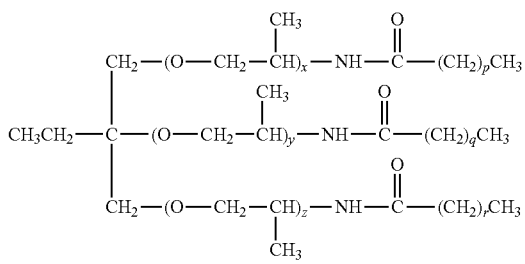

wherein x, y, and z each independently represent the number of propyleneoxy repeat units and x+y+z is from about 5 to about 6, and wherein p, q, and r each, independently of the others, are integers representing the number of repeat —($CH_2$)— units, wherein p, q, and r have an average value of from about 35.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., and polymethylene waxes such as Fischer-Tropsch waxes, available from Sasol Wax Americas, Inc., Shelton, Conn., waxes as disclosed in, for example, U.S. Pat. Nos. 7,407,539, 7,377,971, and 7,381,254, the disclosures of each of which are totally incorporated herein by reference, or the like, as well as mixtures thereof.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, NAUGUARD® 445, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink.

The inks disclosed herein are phase change inks. By this is meant that they are solids at a temperature of about 25° C. and are liquids when melted at temperatures of at least about 40° C. or higher.

The ink compositions in one embodiment have peak melting points of no lower than about 50° C., in another embodiment of no lower than about 60° C., and in yet another embodiment of no lower than about 70° C., and have peak melting points in one embodiment of no higher than about 160° C., in another embodiment of no higher than about 140° C., and in yet another embodiment of no higher than about 100° C.

The ink compositions in one embodiment have onset melting points of no lower than about 50° C., in another embodiment of no lower than about 52° C., and in yet another embodiment of no lower than about 55° C., and have melting points in one embodiment of no higher than about 75° C., in another embodiment of no higher than about 72° C., and in yet another embodiment of no higher than about 69° C.

The ink compositions generally have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 120° C.) in one embodiment of no more than about 30 centipoise (cps), in another embodiment of no more than about 20 cps, and in yet another embodiment of no more than about 15 cps, and in one embodiment of no less than about 2 cps, in another embodiment of no less than about 5 cps, and in yet another embodiment of no less than about 7 cps. In another specific embodiment, the inks have viscosities of from about 7 to about 15 cps at temperatures of about 110, 115, and/or 120° C.

Phase change inks as disclosed herein in some embodiments can exhibit improved average particle size and average particle size stability. By this is meant that when the average particle size present in the ink is measured using, for example, a Malvern Zetasizer (model #ZEN 3600 HT) at 110° C. for a freshly made ink, followed by aging the ink in an oven at 120° C. for specified numbers of days and then re-measuring the ink average particle size, (a) the average particle size is in a desirable initial range, and (b) the average particle size remains relatively stable over time. Desirable initial average particle sizes are, in one embodiment at least about 60 nm, in another embodiment at least about 90 nm, and in yet another embodiment at least about 110 nm, and in one embodiment no more than about 250 nm, in another embodiment no more than about 200 nm, and in yet another embodiment no more than about 150 nm. Desirable particle size stability in terms of change per day is, in one embodiment, at about 120° C., an average particle size change of no more than about 2%, in another embodiment no more than about 1%, and in yet another embodiment no more than about 0.6%.

In another embodiment, average particle size stability can be measured by testing at higher temperatures such as about 130° C. in a printer for periods of 3, 7, 10, or more days and observing banding results. Banding of a pigmented ink, an undesirable print feature, manifests itself as discreet and varying optical density across the printed page. The main reason for this occurrence is various levels of pigment particles that settle in the printhead as the pigmented ink is aged over time. The banding test entails maintaining an ink in the printhead at an elevated temperature for a period of time. Upon loading the test ink in the printer a full 100% density solid print is made on a suitable substrate. After the test period is ended (i.e., 10 days) is ended, the same print is made on an identical substrate with the aged ink and the two prints are compared. Banding CV, calculated as indicated in the Examples hereinbelow, is in one embodiment less than about 5 and in another embodiment less than about 3 for inks as disclosed herein.

Phase change inks as disclosed herein in some embodiments can exhibit improved rheological performance. Some pigments, such as quinacridones, can be difficult to disperse in applications such as phase change inks. The addition of synergists having a structure based on the structure of the pigment that is to be dispersed enables better dispersion of pigment particles thus leading to an improved Newtonian quality.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I 2-(9-Oxoacridin-10(9H)-yl)acetic acid, of the formula

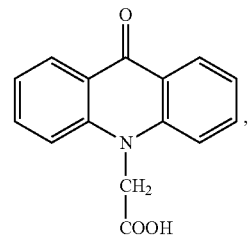 [SMILES: O=C(O)Cn1c2ccccc2c(=O)c2ccccc21]

was prepared by adding 3 g (0.0154 mol) acridin-9(10H)-one and 100 mL dimethylsulfoxide in a 250 mL round-bottomed flask fitted with reflux condenser, argon inlet, and heating bath. To the obtained solution were added with stirring and under argon 3.46 g (0.031 mol) potassium tertbutoxide and 1.7 mL (0.0154 mol) ethyl-2-bromoacetate via a syringe. The temperature was raised to 80° C. and the mixture was allowed to react for 3 h under argon. The mixture was then poured over 500 mL deionized water and sodium chloride was added until a solid precipitated. The solid was isolated using a glass frit. The wet solid was introduced into a 500 mL beaker containing 100 mL 5% by weight NaOH solution. The mixture was heated with stirring at 80° C. for 3 h. The mixture was then allowed to cool at room temperature and hydrochloric acid was added dropwise until the pH reached 2. The resulting solid was isolated by filtration using a glass frit and was washed twice with a mixture of equal parts acetone and water. The final product was allowed to air dry, yielding 3.73 g (90%) solid.

EXAMPLE II 2-(7,14-Dioxoquinolino[2,3-b]acridin-5(7H,12H,14H)-yl)acetic acid, of the formula

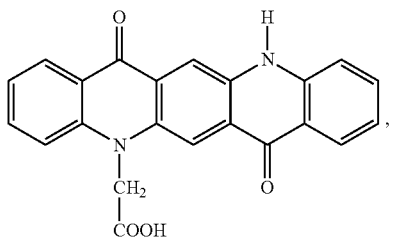 [SMILES: O=C(O)Cn1c2ccccc2c(=O)c2cc3[nH]c4ccccc4c(=O)c3cc21]

was prepared by adding 30 g (0.096 mol) Pigment Violet 19 and 300 mL dimethylsulfoxide in a 1,000 mL round-bottomed flask fitted with reflux condenser, argon inlet, magnetic stirring, and heating bath. Potassium tertbutoxide (21.5 g, 0.096 mol) was added to the flask with stirring and the suspension was allowed to stir for 30 min. To the resulting mixture was added 10.64 mL (0.096 mol) ethyl-2-bromoacetate via syringe. The temperature was raised to 70° C. and the reaction was allowed to proceed for 2 h under argon. The reaction was then allowed to cool at room temperature and the resulting precipitate was isolated via filtration using a glass frit. The red solid was added to a 1,000 mL round-bottomed flask containing a 5% by weight solution of NaOH in deionized water and the suspension was heated with stirring at 100° C. for 2 h. The resulting solid was isolated via filtration using a glass frit. The solid was then added in 500 mL of deionized water and HCl was added dropwise with stirring until the pH became 2. The product was isolated via filtration using a glass frit and washed with copious amounts of water. After drying in a vacuum oven overnight at 80° C., 28.65 g (80%) of a red solid were obtained. FTIR run in a KBr pellet on Nicolet 550 Magna-IR Series II Spectrometer showed the presence of a carbonyl C=O stretch at 1733 cm$^{-1}$ from the carboxylic acid and a broad O—H stretch between 3400 and 2400 cm$^{-1}$.

EXAMPLE III 2,2'-(7,14-Dioxoquinolino[2,3-b]acridine-5,12(7H,14H)-diyl)diacetic acid, of the formula

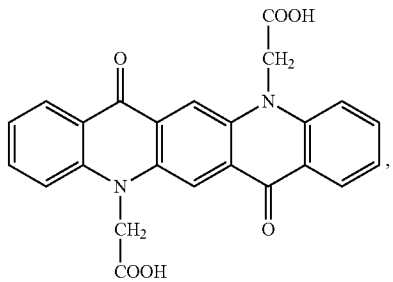 [SMILES: O=C(O)Cn1c2ccccc2c(=O)c2cc3c(cc21)c(=O)c1ccccc1n3CC(=O)O]

was prepared by repeating the process of Example II except that the following amounts were used: Pigment Violet 19: 10 g (0.032 mol); potassium tertbutoxide: 7.18 g (0.064 mol); ethyl-2-bromoacetate: 7.3 mL (0.064 mol). 8.35 g (61%) of a red solid were obtained. FTIR run in a KBr pellet on Nicolet 550 Magna-IR Series II Spectrometer showed the presence of an intense carbonyl C=O stretch at 1738 cm$^{-1}$ from the carboxylic acid and a broad, very intense O—H stretch between 3400 and 2400 cm$^{-1}$ when compared to the monosubstituted derivative.

EXAMPLE IV 2-(2,9-Dimethyl-7,14-dioxoquinolino[2,3-b]acridin-5(7H,12H,14H)-yl) acetic acid, of the formula

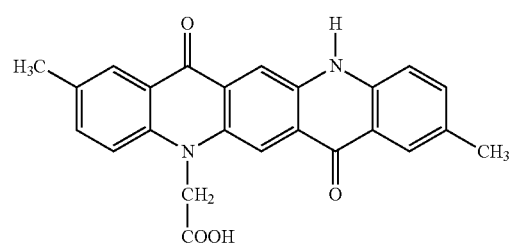

was prepared by repeating the process of Example II except that the following ingredients and amounts were used: Pigment Red 122: 15 g (0.0441 mol) replaced Pigment Violet 19; dimethylsulfoxide: 500 mL; potassium tertbutoxide: 9.9 g (0.0882 mol); ethyl-2-bromoacetate: 4.87 mL (0.0441 mol). 11.64 g (66.2%) of a red solid were obtained. FTIR run in a KBr pellet on Nicolet 550 Magna-IR Series II Spectrometer showed the presence of a carbonyl C=O stretch at 1733 cm$^{-1}$ from the carboxylic acid and a broad O—H stretch between 3400 and 2400 cm$^{-1}$.

EXAMPLE V 2-(6,7,13,14-tetraoxoquinolino[2,3-b]acridin-5(6H,7H,12H,13H,14H)-yl)acetic acid, of the formula

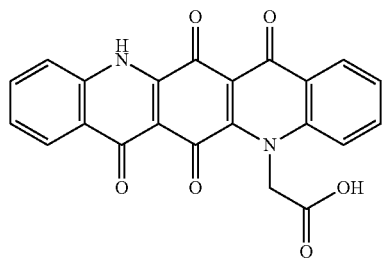 [SMILES: O=C(O)Cn1c2c(c(=O)c3ccccc31)C(=O)c1[nH]c3ccccc3c(=O)c1C2=O]

is prepared by repeating the process of Example IV except that the following ingredients and amounts are used: quino[2,3-b]acridine-6,7,13,14(5H,12H)-tetrone: 15 g (0.0439 mol) (CAS No. 1503-48-6, available from Kissul Corporation Ltd.) replaces Pigment Red 122; dimethylsulfoxide: 300 mL; potassium tertbutoxide: 9.85 g (0.0878 mol); ethyl-2-bromoacetate: 4.85 mL (0.0439 mol).

EXAMPLE VI

Ink base ingredients were assembled as follows:
Polyethylene wax (PE-500, obtained from Baker-Petrolite, distilled as disclosed in U.S. Pat. No. 7,381,254);

Branched triamide of the formula

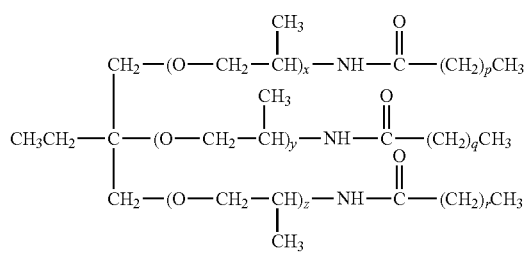

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, prepared as described in Example II of U.S. Pat. No. 6,860,930;

Stearyl stearamide (KEMAMIDE S-180, obtained from Crompton Corporation, Greenwich, Conn.);

Triglycerides of hydrogenated abietic acid (KE-100 Resin, obtained from Arakawa Chemical Industries, Ltd.);

Urethane resin that was the adduct of three equivalents of stearyl isocyanate and a glycerol-based alcohol, prepared as described in Example 4 of U.S. Pat. No. 6,309,453;

Antioxidant (NAUGARD 445).

A UNION PROCESS 01 attritor pre-heated to 120° C. was charged with 1800 g ⅛ inch 440 C Grade 25 stainless steel balls, obtained from Hoover Precision Products Incorporated, that were also preheated to 120° C. Over the steel balls was poured a molten mixture containing 8 g (5%) dispersant, 80.46 g (50.3%) polyethylene wax, 18.5 g (11.57%) branched triamide, 26.66 g (16.66%) stearyl stearamide, 18.66 g (11.6%) KE-100, 2.56 g (1.6%) urethane resin, and 0.34 g (0.21%) antioxidant. Last were added the pigment (4 g, 2.5%) and synergist (0.8 g, 0.5%) indicated in the table below. A multi-staged impeller was then attached to the attritor and the speed adjusted to about 300 rpm. The pigmented mixture was allowed to attrite overnight for 19 h, upon which the resultant ink showed excellent free-flowing behavior when it was discharged and separated from the steel balls in its molten state. Finally the resulting ink was filtered through a 5 μm stainless steel mesh.

Dispersant 1 is a dispersing compound prepared as described in Example 1 of U.S. Pat. No. 7,973,186, where the predominant compound is the mono-reacted material.

| Ink | Pigment | Dispersant | Synergist | Av. Particle size (nm) 0 days @120° C. | Av. Particle size (nm) 6 days @120° C. |
|---|---|---|---|---|---|
| 1 | Pigment Red 122 | Dispersant 1 | none | 456 | 1160 |
| 2 | | | Ex. IV | 172 | 177 |
| 3 | | | Ex. III | 170 | 173 |
| 4 | | | Ex. II | 155 | 164 |
| 5 | | Solsperse 13240 | none | 173 | 388 |
| 6 | | | Ex. I | 165 | 172 |
| 7 | | | Ex. III | 150 | 162 |
| 8 | | | Ex. II | 155 | 161 |
| 9 | Pigment Red 202 | Solsperse 13240 | none | 165 | 187 |
| 10 | | | Ex. II | 174 | 172 |
| 11 | | Dispersant 1 | none | 170 | 200 |
| 12 | | | Ex. II | 170 | 173 |
| 13 | Pigment Violet 19 | Dispersant 1 | none | 135 | 145 |
| 14 | | | Ex. II | 146 | 142 |

-continued

| Ink | Pigment | Dispersant | Synergist | Av. Particle size (nm) 0 days @120° C. | Av. Particle size (nm) 6 days @120° C. |
|---|---|---|---|---|---|
| 15 | | Solsperse 13240 | none | 114 | 116 |
| 16 | | | Ex. II | 127 | 122 |

The inks based on Pigment Red 122 and Pigment Red 202 showed tremendously improved average particle size stabilities when the synergists disclosed herein were included in the ink formulation as contrasted with those inks not including same. For Pigment Violet 19 the benefits of adding a synergist to the ink were not visible until the inks with and without synergist were tested for thermal stability in a printer at 128° C. over a period of 10 days.

EXAMPLE VII

Banding assessment of the inks containing Pigment Violet 19 was carried out in a print test fixture. The printhead initially was flushed thoroughly with clear ink base to eliminate the previous test ink, thereby eliminating the unwanted prospect of cross-contamination between inks. A full 100% density solid print was then made with the Pigment Violet 19 ink on XEROX DIGITAL COLOR XPRESSIONS PLUS copy paper. The ink was then aged in the printer for 10 days at 128° C. Thereafter, another full 100% density solid print was then made with the aged Pigment Violet 19 ink on XEROX DIGITAL COLOR XPRESSIONS PLUS copy paper.

Qualitative assessment of banding was carried out by rating the first print from an ink aged for a period of time such as 10 days at 128° C. and comparing it to a print generated with an ink that was freshly loaded into a XEROX Phaser® 8860 printer. The prints were rated on a scale from 0 to 5. A rating of 0 was deemed as the best possible banding result (qualitatively) such that there was no apparent visual difference between that print and the print that was generated from freshly loaded ink in the printer at Day 0 when the experiment was started. A rating of 5 was deemed as a very poor banding result as a result of the varying optical density across the page from the varying degrees of pigment particle settling in the nozzles of the printer. Intermediate banding ratings of 1 to 4 had increasing levels of banding.

Quantitative assessment of banding was also carried out. A suitable measure of the densometric consistency of a solid fill is optical density, and can be determined by measuring it in discrete intervals, such as 1 mm. For a measure of consistent optical density across the page (e.g., normal to the print process direction), the percentage standard deviation of the measured optical densities should be as low as possible to mitigate visual recognition of a banding pattern.

The mean optical density of the print image is defined as the arithmetic mean of the various individual optical densities measured across the printed page, as calculated from:

$$\bar{x} = \frac{1}{n}\sum_{i=1}^{n} x_i$$

such that $\bar{x}$ is the average of measured optical densities, i is an individual optical density measurement position, $x_i$ is an individual optical density measurement result, and n is the number of optical density measurements made. The measured optical densities' standard deviation, as an unbiased estimator, is calculated from:

$$s = \sqrt{\frac{1}{N-1}\sum_{i=1}^{n}(x_i - \bar{x})^2}$$

such that s is the measured optical densities' standard deviation, $\bar{x}$ is the average of measured optical densities, i is an individual optical density measurement position, $x_i$ is an individual optical density measurement result, and N is the number of optical density measurements made. The coefficient of variation of the measured optical densities, or banding CV, is thus calculated from:

$$\text{Banding } CV = \frac{s}{\bar{x}} * 100\%.$$

The optical densities of the prints were measured under ambient conditions by a GretagMacBeth ColorEye® 7000A spectrophotometer, D50 illuminant, 2° observer and ANSI Status A response. In the absence of banding of an ink, there should also ideally be no visually discernable differences between the two prints. In one embodiment, it is desirable for a print from an ink that was aged in a printhead at the printer's normal jetting temperature or at a stress temperature of about 130° C. or higher to have a banding CV of less than about 5. Where possible the qualitative and quantitative banding CV were assessed for the same print. The banding results of Inks 13 and 14 are shown in the tables below.

| Ink | Pigment | Dispersant | Synergist | Banding rating @128° C. 3 days | Banding rating @128° C. 10 days |
|---|---|---|---|---|---|
| 13 | Pigment | Dispersant 1 | none | 0 | 1 |
| 14 | Violet 19 | | Ex. II | 0 | 0 |

Although the particle size stability, measured using a Malvern Zetasizer HT (model number ZEN 3600), indicated stability for these inks for at least 6 days and there was no visible difference in banding after 3 days in the printer at 128° C., the difference was visible after 10 days in the printer. The ink without synergist started to fail, while the ink with synergist continued to be stable.

| Ink | Pigment | Dispersant | Synergist | Mean Optical Density (au) | Banding CV |
|---|---|---|---|---|---|
| 13 | Pigment | Dispersant 1 | none | 1.21 | 6.19 |
| 14 | Violet 19 | | Ex. II | 1.36 | 1.82 |
| Comparative | dye | none | none | 1.36 | 1.89 |

It is desirable to have as low a banding CV as possible. Ink 14 containing the synergist of Example II had a relatively lower banding CV of ~1.8, which was comparable to a Comparative ink made of the same ink base but containing a dye-based colorant (i.e., one dissolved in the ink on a molecular level) and containing no dispersant or synergist, and did not show any visually discernable banding pattern. Ink 13 containing no synergist had a relatively higher banding CV of ~6.2 and had a visually discernable banding pattern.

Figure 3:
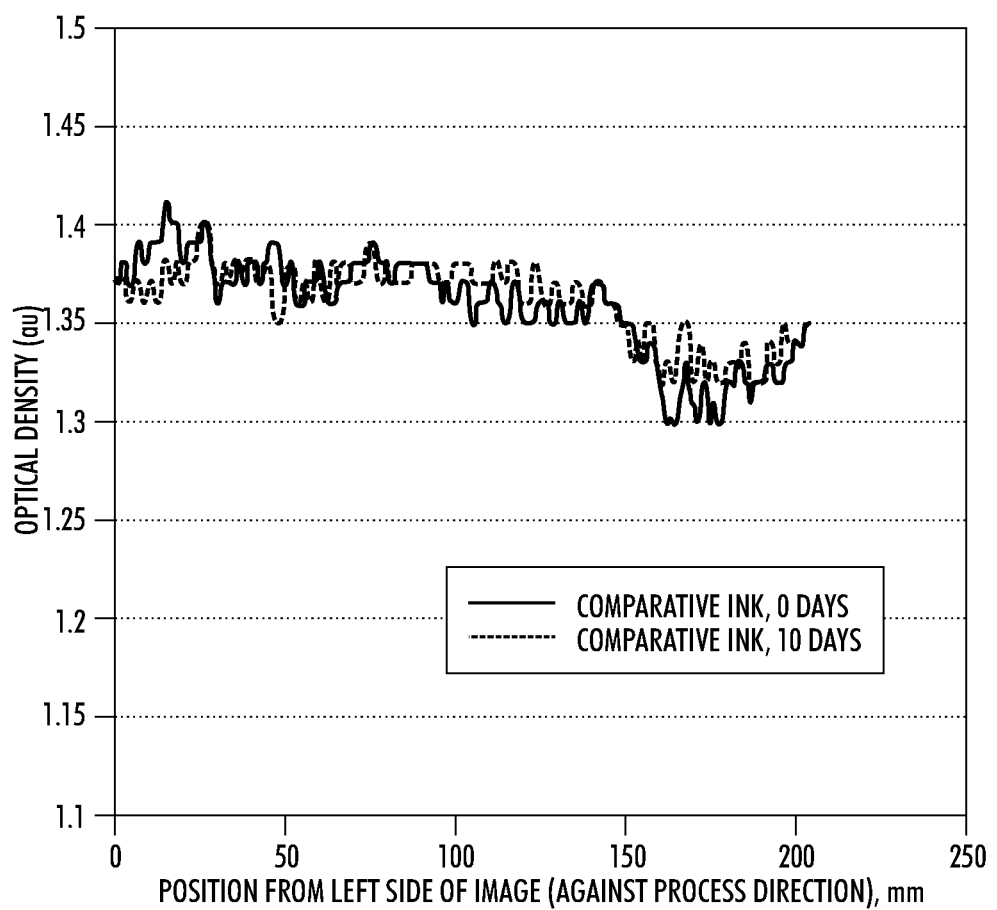

FIG. 3 shows the optical density (in absorbance units) for Ink 13, FIG. 4 shows the optical density for Ink 14, and FIG. 5 shows the optical density in au units for the Comparative ink containing the dye-based colorant. In each case, the solid line represents the optical density after 0 days of aging, and the dotted line represents the optical density after 10 days of aging in the printer at 128° C. A noticeable decrease in optical density was noted for Ink 13.

COMPARATIVE EXAMPLE A

By the method of Example VI and similar to the method used for Examples II, III, and IV for Inks 2, 3, and 4, an ink was formed from 4-((7,14-dioxoquinolino[2,3-b]acridin-5(7H,12H,14H)-yl)methyl)benzoic acid, a quinacridone pigment, and Dispersant 1. While this ink had a Newtonian quality, the quinacridone particles in the ink were unstable. The average particle size of a freshly made ink containing this compound on day zero was 135 nm. After the ink was aged in an oven at 120° C. for 7 days, the average particle size was 389 nm, representing about 28% increase in average particle size per day, indicating that this particular compound did not stabilize the quinacridone particles in the ink vehicle at high temperature. In preferred embodiments, it is desirable that a pigmented ink while residing in a printer demonstrates good particle size stability such that a change in average particle size of no more than about 2% per day occurs when subjected to a temperature of about 120° C.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising:

(i) an ink carrier;

(ii) a quinacridone pigment;

(iii) a synergist:

(a) of the formula:

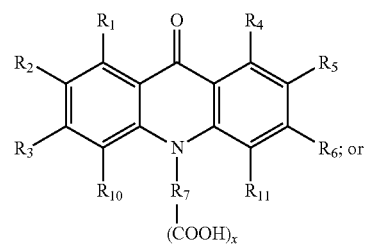

(b) of the formula

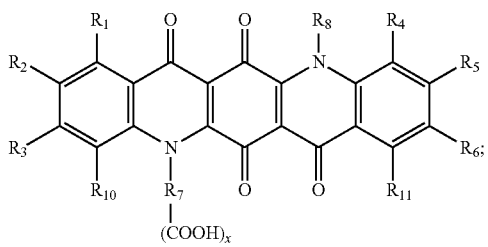

wherein:
(1) $R_1, R_2, R_3, R_4, R_5, R_6, R_{10}$, and $R_{11}$ each, independently of the others, is:
(A) hydrogen;
(B) halogen;
(C) alkyl, including substituted and unsubstituted alkyl, wherein hetero atoms either may or may not be present in alkyl; or
(D) alkoxy, including substituted and substituted alkoxy, wherein hetero atoms either may or may not be present in alkoxy;
(2) $R_7$ is:
(A) alkylene, including substituted and unsubstituted alkylene, wherein hetero atoms either may or may not be present in alkylene;
(B) arylene, including substituted and unsubstituted arylene, wherein hetero atoms either may or may not be present in arylene;
(C) arylalkylene, including substituted and unsubstituted arylalkylene, wherein hetero atoms either may or may not be present in arylalkylene; or
(D) alkyaryene, including substituted and unsubstituted alkylarylene, wherein hetero atoms either may or may not be present in alkylarylene;
(3) x is an integer of at least 1; and
(4) $R_8$ is:
(A) hydrogen; or
(B) —$R_9$—$(COOH)_y$, wherein $R_9$ has the same definition as $R_7$ and can be either the same as or different from $R_7$, and wherein y has the same definition as x, and can be either the same as or different from x; and
(iv) a pigment dispersant;
said phase change ink being a solid at about 25° C.

2. An ink according to claim 1 wherein the synergist is (a) 2-(9-oxoacridin-10(9H)-yl)acetic acid, (b)2-(6,7,13,14-tetraoxoquinolino[2,3-b]acridin-5(6H,7H,12H, 13H,14H)-yl) acetic acid, or a mixture thereof.

3. An ink according, to claim wherein the synergist is present in the ink in an amount of from about 5% to about 40% by weight of the quinacridone pigment.

4. An ink according, to claim 1 wherein the pigment dispersant is (a) an amide of polyhydroxystearic acid and polyethyleneimine, or (b) of the formula

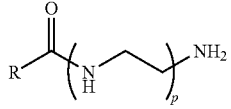

wherein R is a linear aliphatic hydrocarbon having an average of about 48 carbons and p is 4, 5, or 6.

5. An ink according, to claim 1 wherein the pigment dispersant is present in the ink in an amount of from about 5% to about 300% by weight of the quinacridone pigment.

6. An ink according to claim 1 wherein the quinacridone pigment is Pigment Violet 19, Pigment Red 122, Pigment Red 202, Pigment Red 206, C.I. 73920, Pigment. Orange 48, Pigment Orange 49, or a mixture thereof.

7. An ink according to claim 1 wherein the quinacridone pigment is present in the ink in an amount of from about 0.5% to about 10% by weight.

8. An ink according to claim 1 wherein the quinacridone pigment is of the formula

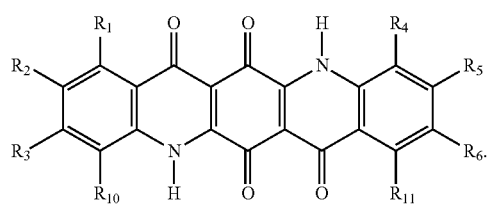

9. An ink according to claim 8 wherein $R_1, R_2, R_3, R_4, R_5, R_6, R_{10}$, and $R_{11}$ are the same for both the synergist and the quinacridone pigment.

10. An ink according to claim 1 wherein $R_7$ is —$CH_2$—.

11. An ink according to claim 1 wherein the ink carrier comprises:
(a) a polyethylene wax;
(b) a monoamide
(c) a urethane; and
(d) a triamide.

12. An ink according to claim 1 wherein the ink exhibits an average particle size of no more than about 250 nm and exhibits a change in average particle size of no more than about 2% per day when subjected to a temperature of about 120°C for a period of about 6 days.

13. An ink according to claim 1 wherein the ink exhibits a banding CV of no more than about 5 when subjected to a temperature of about 130° C. for a period of about 10 days.

14. A phase change ink comprising:
(i) an ink carrier;
(ii) a quinacridone pigment which is:
(a) Pigment Red 122:
(b) Pigment Red 202;
(c) Pigment Violet 19;
(d) Pigment Red 206;
(e) C.I. 73920;
(f) Pigment Orange 48;
(g) Pigment Orange 49; or
(h) a mixture thereof:
(iii) a syneritist:
(a) of the formula:

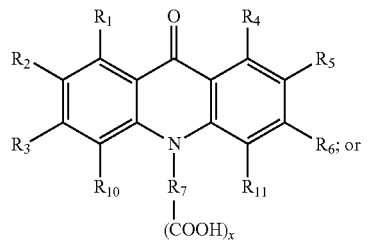

(b) of the formula;

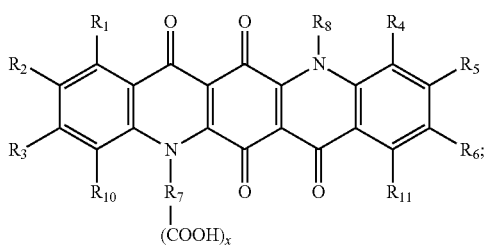

wherein:
(1) $R_1$, $R_2$, $R_3$, $R_4$, $R_5$, $R_6$, $R_{10}$, and $R_{11}$ each, independently of the others, is:
(A) hydrogen;
(B) halogen;
(C) alkyl, including substituted and unsubstituted alkyl, wherein hetero atoms either may or may not be present in alkyl; or
(D) alkoxy, including substituted and substituted alkoxy, wherein hetero atoms either may or may not be present in alkoxy;
(2) $R_7$ is:
(A) alkylene, including substituted and unsubstituted alkylene, wherein hetero atoms either may or may not be present in alkylene:
(B) arylene, including substituted and unsubstituted arylene, wherein hetero atoms either may or may not be present in arylene;
(C) arylalkylene, including substituted and unsubstituted arylalkylene, wherein hetero atoms either may or may not be present in arylalkylene; or
(D) alkylarylene, including substituted and unsubstituted alkylarylene, wherein hetero atoms either may or may not be present in alkylarylene;
(3) x is an integer of at least 1; and
(4) $R_8$ is:
(A) hydrogen or
(B) —$R_9$—$(COOH)_y$, wherein $R_9$ has the same definition as $R_7$ and can be either the same as or different from $R_7$, and wherein y has the same definition as x, and can be either the same as or different from x; and
(iv) a pigment dispersant;
said phase change ink:
(a1) having, a peak melting point of no lower than about 60° C.;
(a2) having an onset melting point of no lower than about 50° C.;
(a3) having a melt viscosity at the jetting temperature of from about 5 to about 20 cps;
(a4) having an average particle size of no more than about 250nm; or
(a5) exhibiting a change in average particle size of no more than about 2% per day when subjected to a temperature of about 120° C. for a period of about 6 days.

15. An ink according to claim 14 wherein the quinacridone pigment is Pigment Red 122.

16. An ink according to claim 14 wherein the pigment dispersant is (a) an amide of polyhydroxystearic acid and polyethyleneimine, or (b) of the formula

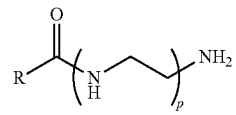

wherein R is a linear aliphatic hydrocarbon having an average of about 48 carbons and p is 4, 5, or 6.

17. A phase change ink con
   (i) an ink carrier;
   (ii) a dispersant; and
   (iii) a quinacridone pigment treated with a carboxylated quinacridone synergist, said synergist anchoring said dispersant to said quinacridone pigment;
   wherein the ink exhibits a change in particle size of no more than about 250 nm and exhibits an increase in average particle size of no more than about 2% per day when subjected to a temperature of about 120° C. for a period of about 6 days.

18. An ink according to claim 1, wherein the synergist is of the formula

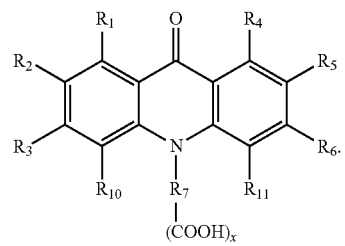

19. An ink according to claim 1, wherein the synergist is of the formula

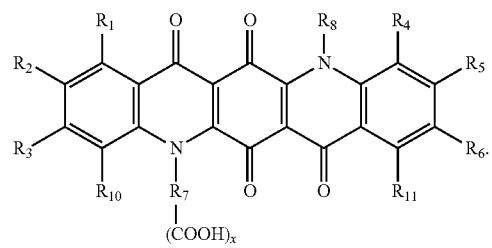

* * * * *